(12) United States Patent
Wagner-Stuerz

(10) Patent No.: US 11,486,515 B2
(45) Date of Patent: Nov. 1, 2022

(54) DETERMINING THE OPERABILITY OF A FLUID DRIVEN SAFETY VALVE

(71) Applicant: Samson Aktiengesellschaft, Frankfurt am Main (DE)

(72) Inventor: David Wagner-Stuerz, Muehltal (DE)

(73) Assignee: SAMSON AKTIENGESELLSCHAFT, Frankfurt am Main (DE)

( * ) Notice: Subject to any disclaimer, the term of this patent is extended or adjusted under 35 U.S.C. 154(b) by 932 days.

(21) Appl. No.: 16/275,648

(22) Filed: Feb. 14, 2019

(65) Prior Publication Data

US 2019/0249798 A1    Aug. 15, 2019

(30) Foreign Application Priority Data

Feb. 14, 2018   (DE) .................... 10 2018 103 324.9

(51) Int. Cl.
*F16K 37/00*    (2006.01)
*F16K 17/04*    (2006.01)
(Continued)

(52) U.S. Cl.
CPC ........ *F16K 37/0083* (2013.01); *F15B 19/005* (2013.01); *F15B 19/007* (2013.01); *F16K 17/04* (2013.01); *F16K 31/1221* (2013.01); *F16K 37/005* (2013.01); *F16K 37/0041* (2013.01); *F16K 37/0091* (2013.01); *G01M 99/00* (2013.01); *G05B 9/02* (2013.01); *G05B 23/0254* (2013.01); *F15B 20/00* (2013.01); *F15B 2211/6313* (2013.01); *F15B 2211/6336* (2013.01); *F15B 2211/7052* (2013.01); *F15B 2211/8613* (2013.01); *F15B 2211/8636* (2013.01); *F15B 2211/87* (2013.01); *F15B 2211/8752* (2013.01);
(Continued)

(58) Field of Classification Search
CPC ............ F16K 37/0083; F16K 37/0091; F16K 37/0041; F16K 37/005; F16K 31/1221; F15B 19/005; F15B 2211/6336; F15B 2211/8752; F15B 20/00; F15B 2211/8755
See application file for complete search history.

(56) References Cited

U.S. PATENT DOCUMENTS

| 5,197,328 | A  |   | 3/1993 | Fitzgerald |
| 8,814,133 | B2 | * | 8/2014 | Li ........................ F15B 19/002 251/30.01 |

(Continued)

FOREIGN PATENT DOCUMENTS

| DE | 4218320 A1 | 12/1993 |
| DE | 602004012980 T2 | 5/2009 |

(Continued)

*Primary Examiner* — Atif H Chaudry
(74) *Attorney, Agent, or Firm* — Steven M. Shape

(57) ABSTRACT

For determining the operability of a fluid driven safety valve, a method comprising the following steps is described: A partial stroke test is performed on the safety valve, resulting in a stroke-pressure curve. The stroke pressure curve is extrapolated (330, 340) beyond the measured range (360) up to the safety closing position (350). From the extrapolated stroke-pressure curve, the closing pressure reserve (320) can be determined. In this way, the functionality of the safety valve can be checked during operation.

7 Claims, 6 Drawing Sheets

(51) Int. Cl.
*F15B 19/00* (2006.01)
*F16K 31/122* (2006.01)
*F15B 20/00* (2006.01)
*G01M 99/00* (2011.01)
*G05B 9/02* (2006.01)
*G05B 23/02* (2006.01)

(52) U.S. Cl.
CPC ............... *F15B 2211/8755* (2013.01); *F15B 2211/8855* (2013.01); *G05B 2219/42216* (2013.01)

(56) References Cited

U.S. PATENT DOCUMENTS

| | | | |
|---|---|---|---|
| 2006/0219299 A1* | 10/2006 | Snowbarger | F16K 37/0091 137/487.5 |
| 2011/0114191 A1* | 5/2011 | Wheater | F16K 37/0091 137/12 |
| 2017/0328489 A1* | 11/2017 | Beck | F16K 37/005 |

FOREIGN PATENT DOCUMENTS

| | | |
|---|---|---|
| WO | 2009013205 A1 | 1/2009 |
| WO | 2015/171843 A2 | 11/2015 |

* cited by examiner

DETERMINING THE OPERABILITY OF A FLUID DRIVEN SAFETY VALVE

CROSS-REFERENCE TO RELATED APPLICATIONS

This application claims priority to German application 10 2018 103 324.9, filed Feb. 14, 2018, which is hereby incorporated by reference in its entirety.

FIELD OF INVENTION

Control valves consist of a drive and a movable valve member. They are used to regulate a fluid flow. The drive rod of the valve member is usually guided to the outside through a fluid-tight housing or cover of the valve. A seal (e.g. packing) seals the drive rod to the valve-housing-cover towards the outside. On the outside there is a drive which acts on the drive rod and moves the valve member. Fluid drives (usually pneumatic) are typically used as drives to move the drive rod. Such control valves can be rotary valves as well as stroke valves.

Various static and sliding friction occur when the valve element is moved by the drive. The causes of friction may be:
- the seal between the drive rod and the valve-housing-cover
- friction between the drive rod and the drive housing seal
- for rotary valves: friction of the rotary element on the sealing lips
- for stroke valves: friction e.g. of the slider on the sealing lips
- encrustations due to corrosion or particles in the fluid
- friction in the drive due to piston sealing elements for fluidic separation of the drive chambers Open/Close control valves tend to stick during longer idle times. Increased static friction demands large forces from the drive. Pneumatic drives require a high pressure to break away the control valve against static friction. A larger increase or decrease in pressure can be seen in the stroke-pressure curve of the valve until a change in displacement can be detected.

In the area of safety-relevant fittings, single-acting pneumatic drives are generally used. The drives, which are one-sidedly prestressed by spring forces, move independently into a safe position when the drive is vented, i.e. the compressed air escapes from the chamber of the drive. This happens, for example, when a current-pressure (I/P) converter or a magnetic valve is no longer energized.

In safety fittings, the safety valve is often open during normal operation, and in the event of a failure (e.g. electrical power failure) the safety valve closes automatically. The compressed air always acts against the spring force. If the drive is vented, the valve begins to close as the spring forces are released. In the stroke-pressure curve, this configuration causes the valve to break away against the static friction when the compressed air pressure is reduced.

The safety position may also be open when de-energized (drive vented) and closed when energized (drive ventilated).

PRIOR ART

To ensure the safe operation of such a fitting, it is cyclically tested, whether the actuator moves. In these tests, it is not desired that the fitting moves completely into the safety position, in order not to disturb the ongoing operation. To avoid this, the Partial Stroke Test (PST) was introduced. The actuator is only moved so far that the actuator safely moves for part of its travel without significantly influencing the process of the plant. In order to avoid overshooting, the pressure of the compressed air must be increased again after breakaway. Uniform continued movement towards the closed position is achieved if the pressure of the compressed air is subsequently reduced in a controlled manner, i.e. the drive is slowly vented. After the actuator was moved for a sufficient part of its travel, it is returned to the starting position. With this test the basic movability of the actuator can be tested.

A disadvantage, however, is that no statement can be made as to whether the actuator would also move to the safe position with the remaining spring force or the compressive force of the compressed air in the drive.

A setting device for an open-close valve with pneumatic drive which is equipped with a positioner containing a routine for performing a partial stroke test is described in publication WO 2009/013205 A1. However, provisions to determine whether the safety position can actually be reached are not described here.

The disclosure document DE 42 18 320 A1 describes a method and a device which can record the temporal characteristics of a system-relevant and a fitting-relevant measured quantity during a switching process of a fitting. This can also be, for example, a stroke-pressure curve. Due to changes in subsequent switching processes the condition of the fitting can be inferred. Amongst other things, it is disadvantageous that no partial stroke test is intended and thus the operation must be impaired during each test.

The publication U.S. Pat. No. 5,197,328 reveals similar matter. The operating state of a pneumatically operated valve is also investigated there, and also in this case the full motion between the open and the closed stated of the valve is passed through.

In the publication DE 60 2004 012 980 T2 a method and a system for performing valve diagnoses and deriving valve characteristics are described, wherein a plurality of sequential setting points are traversed, and wherein impulse response, friction or spring range of the valve are derived from the recorded data. The main issue here is how quickly or directly the valve reacts to switching or control impulses. Whether the safety position can be reached is not explicitly checked here, in particular not without affecting the operation of the system.

Object of the Invention

The object of the invention is to specify a method by which a statement can be made about the safe attainment of the safety position on the basis of a partial stroke test.

Solution

This object is achieved by the subject matter of the independent claims. Advantageous developments of the subject of the independent claims are characterized in the subclaims. The wording of all claims is hereby made by the reference to the content of this description.

The use of the singular shall not exclude the plural, which shall also apply in the reverse sense, unless otherwise disclosed.

In the following, individual steps of the method are described in more detail.

The steps do not necessarily have to be carried out in the given order, and the method to be described may also include other steps not mentioned.

In order to solve the problem, the inventive method for determining the operability of a fluid driven safety valve is proposed.

It should first be clarified that the process or safety valve has a valve member and a spring return, wherein the valve member is moved into a safety position by the spring return in case of a power failure or an uncontrolled drop in the pressure of the driving fluid.

The safety valve is equipped with means for determining the pressure of the driving fluid. These can be very different, for example the correlation of the current of a current-pressure (I/P) converter to the pressure value or a separate sensor. The pressure of the driving fluid acts against the spring.

In addition, the safety valve has means for determining the position of the valve member. Here sensors are suitable, e.g. magnetic sensors, whereby the position of a magnet is proportional to the drive rod.

The actual method is as follows: A partial stroke test is performed on the safety valve by varying the pressure in the driving fluid. The position of the valve member as a function of the pressure in the driving fluid is recorded during the partial stroke test, resulting in a stroke-pressure curve. On the one hand, this determines whether the valve member is still breaking loose, on the other hand, the stroke-pressure curve is obtained.

The stroke-pressure curve is mathematically modelled beyond the measured range and then extrapolated to the safety position of the valve member. The pressure associated with this safety position in the mathematically determined stroke-pressure curve is determined. Only if this is higher than the pressure in the liquid to be regulated at the valve member, the safety valve can still fulfil its safety function.

With the proposed method, it is possible not only to test the breakaway of the valve member but also to determine whether the valve member can still reach its safety position, i.e. whether the function of the safety valve can still be fulfilled.

The easiest way to extrapolate the stroke-pressure curve is to model the stroke pressure curve in a relevant area using a linear equation. The linear equation for the stroke-pressure curve is determined from at least two stroke-pressure values measured during the partial stroke test.

It makes sense to take the at least two stroke pressure values measured during the partial stroke test from the range after overcoming the static friction of the valve element.

If one wants to achieve a higher accuracy than it is possible with a simple straight line, it is advisable to record a stroke-pressure characteristic curve for the safety valve when commissioning the safety valve. The stroke-pressure curve is then mathematically modelled beyond the measured range by shifting the stroke-pressure curve recorded when the safety valve was com-missioned to a stroke-pressure value measured during the partial stroke test after overcoming the static friction of the valve member. This is especially advantageous if the stroke-pressure curve of the safety valve shows a non-linear progression.

In addition, it is then sufficient to measure a single point on the actual stroke-pressure curve during the PST.

This recorded characteristic curve can again be simplified (in case of an at least approximately linear progression) and protected against interpolation errors by approximating it by a straight line or by several supporting points and or equation functions.

It then remains sufficient to measure only a single point on the actual stroke-pressure curve during the PST.

The object is further achieved by a fluid driven safety valve with a valve member and a spring return, wherein the valve member is moved to a safety position by the spring return in the event of a power failure or an uncontrolled drop in the pressure of the driving fluid.

The safety valve has means for determining the pressure of the driving fluid, wherein the pressure of the driving fluid acts against the spring. Furthermore, it has means to determine the position of the valve member.

In particular, the safety valve has a controller for performing the method described above, wherein the controller is capable of performing a partial stroke test on the safety valve by varying the pressure in the driving fluid. When performing a partial stroke test, the controller records the position of the valve member as a function of the pressure in the driving fluid during the partial stroke test, resulting in a stroke-pressure curve. The controller also mathematically models the stroke-pressure curve beyond the measured range and then extrapolates the mathematically determined stroke-pressure curve up to the safety position of the valve member. In this way, the controller is able to determine the pressure associated with this safety position in the mathematically determined stroke-pressure curve. A further possibility is that the stroke/pressure curve is recorded in the controller (positioner) and the data is transmitted to another computer for evaluation and interpolation. The other computer transmits the results to the positioner for display and/or to any other display and/or warning unit. In this way, all relevant information can be accessed at any time and from any location. (e.g. via cloud).

Further details and characteristics can be found in the following description of preferred embodiments in combination with the subclaims. Here the respective characteristics can be realized separately or in combination with each other. The possibilities to achieve the object are not limited to the embodiments.

An embodiment is shown schematically in the figures. Identical reference numbers in the individual figures denote identical or functionally identical elements or elements corresponding to each other with respect to their functions. Specifically, FIG. 1A shows the typical arrangement of a fluid-driven safety valve in the open position;

Figure 1A:
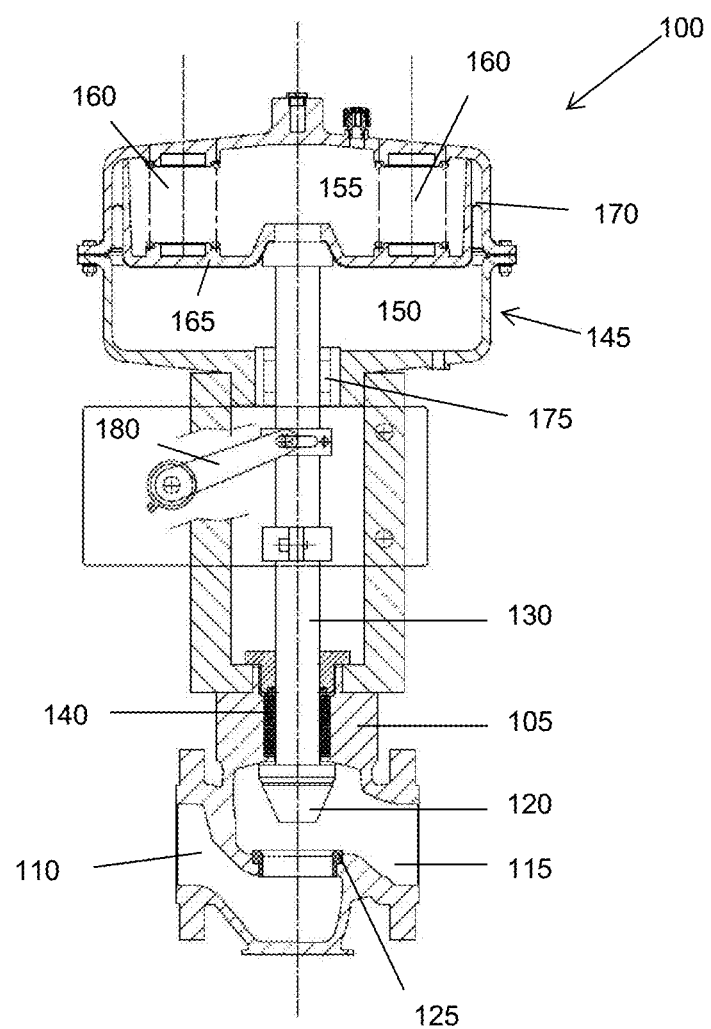
FIG. 1B shows the typical arrangement of a fluid-driven safety valve in the closed position.

FIG. 1A shows a typical arrangement of a fluid-driven, single-acting process valve 100 with a valve housing 105. Between the inflow side 110 and the outflow side 115 there is a valve member 120 which can be pressed into the valve seat 125 to throttle the flow of a process fluid flowing from inflow side 110 to outflow side 115. The valve rod or drive rod 130 is used for this purpose. The passage of the valve rod 130 through the fluid-tight valve housing 105 is sealed by a seal or stuffing box 140.

At the upper end of the valve rod 130 there is a fluidic drive 145, wherein the driving fluid is typically gas. The drive 145 has two chambers, a lower compressed air chamber 150 and an upper chamber 155, in which two springs 160 act on the valve rod 130 via a plate 165. The two chambers 150 and 155 are separated by a membrane 170, wherein the membrane 170 is impermeable to the driving fluid, typically compressed air. Such a design is referred to as a single-acting pneumatic drive because compressed air is introduced into only one chamber, the compressed air chamber 150, and not both. The valve rod 130 must pass through the housing of the drive 145 and be sealed against the driving fluid. For this purpose, this passage is sealed by a drive housing seal 175.

Typically, the valve rod 130 also has a signal receiver 180 to determine the position of the valve member 120.

In FIG. 1A there is sufficient compressed air in the compressed air chamber 150 so that the process valve 100 is open.

Figure 1B:
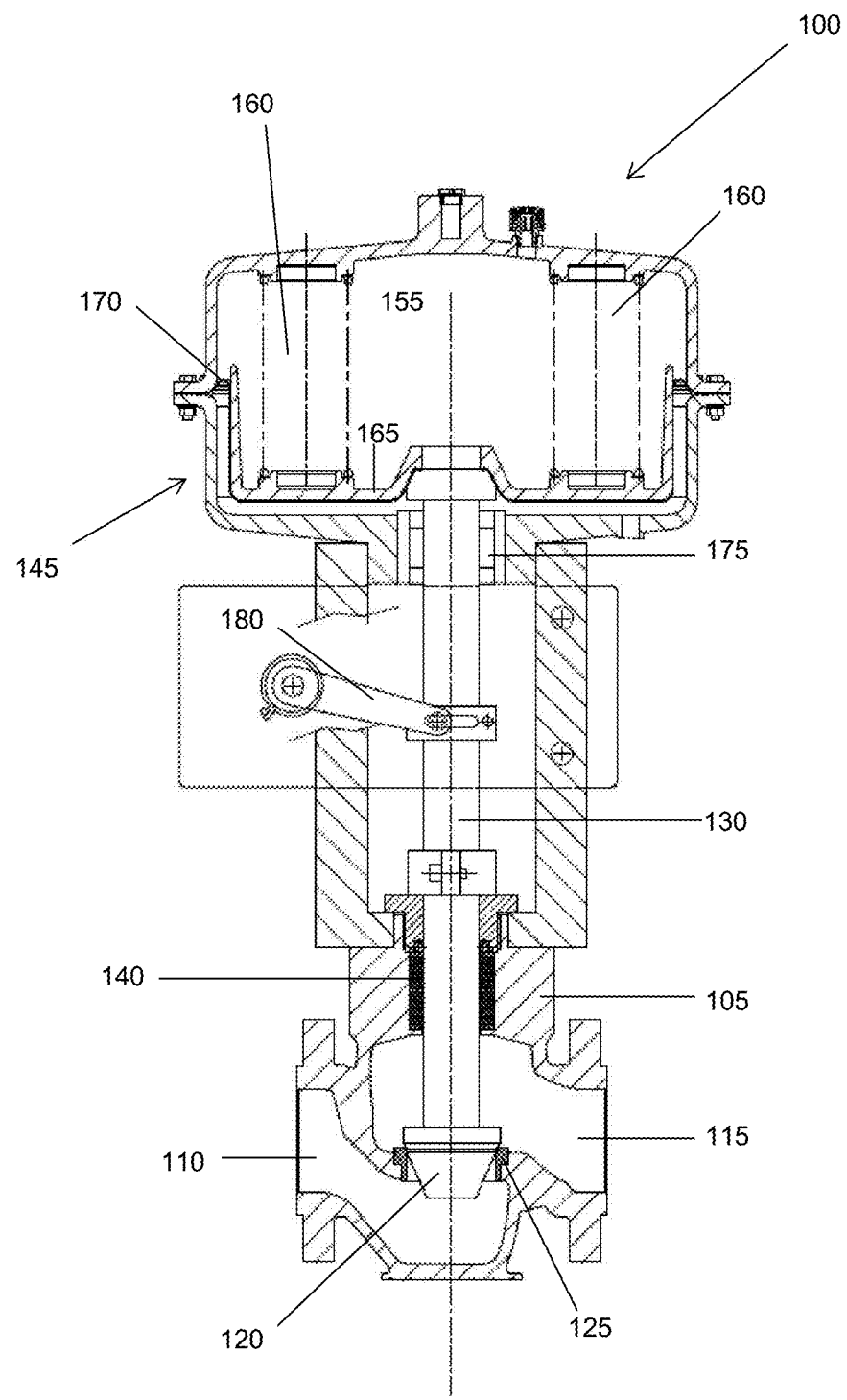

In FIG. 1B the compressed air chamber 150 is vented such that the springs 160 could close the process valve 100.

Such a process valve is basically suitable for use as a safety valve, as it closes automatically in the event of uncontrolled venting.

Two types of forces or torques can occur in an open/close valve which counteract the movement of the drive 145. These are on the one hand the static friction and on the other hand the sliding friction. An increased static friction can be recognized by a change in the breakaway pressure. The sliding friction leads to a parallel displacement of the stroke-pressure curve. In the worst case, both effects can lead to the valve no longer being able to close.

In order to detect this in time, the pressure or force or torque reserve can be determined with a PST (conversion of the pressure reserve by means of the torque characteristic curve of the drive to the torque reserve). If, for example, the process pressure of the process medium is known, the minimum pressure or force or torque reserve required for safe closing of the process valve can be determined from the pressure surface of the valve element to which the process pressure can be applied.

Figure 2:
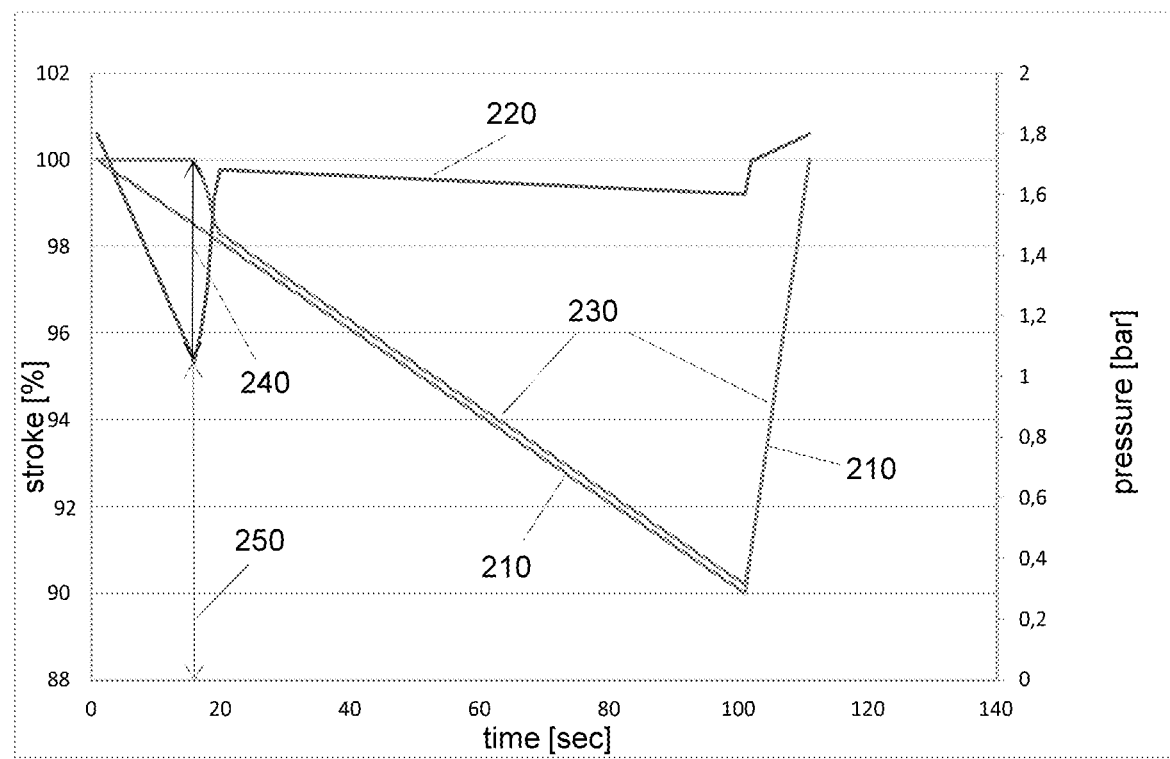
FIG. 2 shows stroke and pressure over time during a partial stroke test (PST) on a safety valve.

FIG. 2 shows the relative stroke of the valve member 120 and the pressure over time during a Partial Stroke Test (PST) on a safety valve 100. It is a single-acting pneumatic drive with spring return. The safety position is closed without electrical power.

The setpoint 210 shows the ideal frictionless stroke when closing the valve with constant venting. The pressure is reduced and the spring forces of the drive 145 are released and move the valve member 120 in the direction of the closed position.

The actual pressure curve 220 first shows a significant reduction in pressure before the stroke (actual stroke) 230 changes. This shows the breaking away of the valve member 120 from its open position, in which it was possibly already stuck, i.e. subject to static friction. The difference between the initial, maximum pressure and the pressure at the moment of breakaway is called breakaway pressure 240. The breakaway pressure is the pressure or force that is sufficient to overcome the static friction and disengage the valve.

The pressure in the driving fluid at the moment of breakaway remains as reserve 250 if it is greater than 0 bar. If not, the safety valve 100 can no longer fulfil its function.

The pressure is readjusted after the breakaway, i.e. increased again, so that an overshoot is avoided or reduced.

After overcoming the static friction and after the accelerated stroke movement, uniform venting of the drive 145 takes place (slow pressure reduction) until 90% of the stroke is reached. The actual stroke curve 230 is approximately linear in the area of sliding friction and parallel to the nominal stroke curve 210, shifted parallel by the amount of the sliding friction.

After reaching 90%, the pressure in the drive 145 is increased again so that the valve member 120 fully opens again against the spring forces. The PST has been completed.

Figure 3:
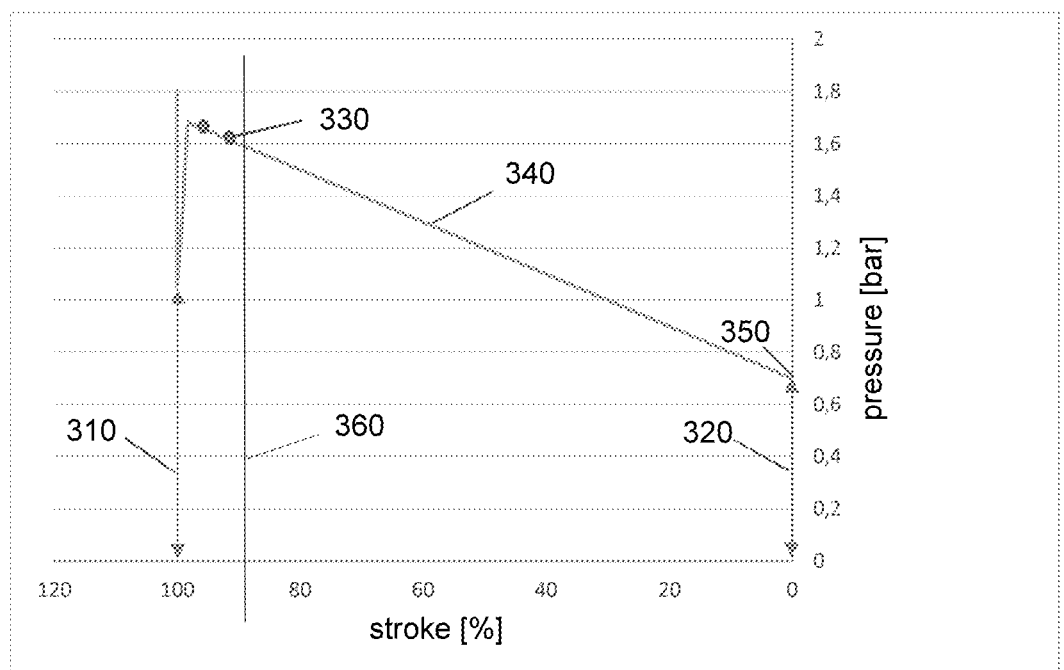
FIG. 3 shows a stroke-pressure curve.

By eliminating the time and plotting the pressure 220 over the stroke 230, the stroke-pressure curve of FIG. 3 can be generated from FIG. 2.

The closing pressure reserve 320 is the pressure reserve that remains after the safety valve has been closed. The closing pressure reserve 320, which occurs with constant movement (sliding friction), can be determined from FIG. 3. For this purpose, the stroke-pressure curve is extrapolated according to FIG. 3 up to the closed position (stroke=0).

Thereby there are various possibilities to determine the progression of the curve. Either one determines a linear equation during the movement of the PST (after overcoming the static friction), which is used for the extrapolation. Or one can take a reference curve (characteristic curve) which was recorded during initialization or commissioning. Furthermore, the theoretically determined characteristic curve of the spring could also be used.

FIG. 3 shows the determination of the closing pressure reserve 320 under the assumption of a constant linear movement beyond the range determined by the PST. The interpolation curve 340 was determined using two measured pressure points 330. The closing pressure reserve 320 corresponds to the pressure value 350 at stroke=0 on the interpolation line 340.

During the PST, a reversal of motion 360 occurs (here at 90% of the stroke). The hysteresis resulting from the reversal can also be taken into account when determining the linear equation (not shown in the diagram). If several measured stroke-pressure points 330 from the PST are available, the less favourable points for the closing pressure reserve 320 are used to determine the linear equation.

In FIG. 3, the reserve for the breakaway pressure 310 is greater than the reserve for complete closing 320.

Figure 4:
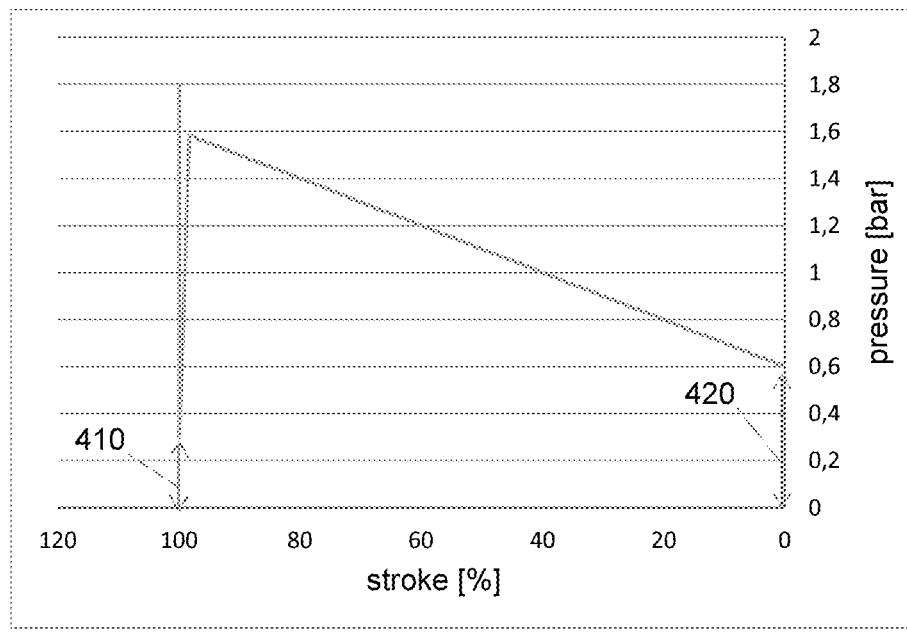
FIG. 4 shows another example of the break-away reserve and the closing pressure reserve.

In FIG. 4, the breakaway pressure reserve 410 is less than the complete closing reserve 420.

Figure 5:
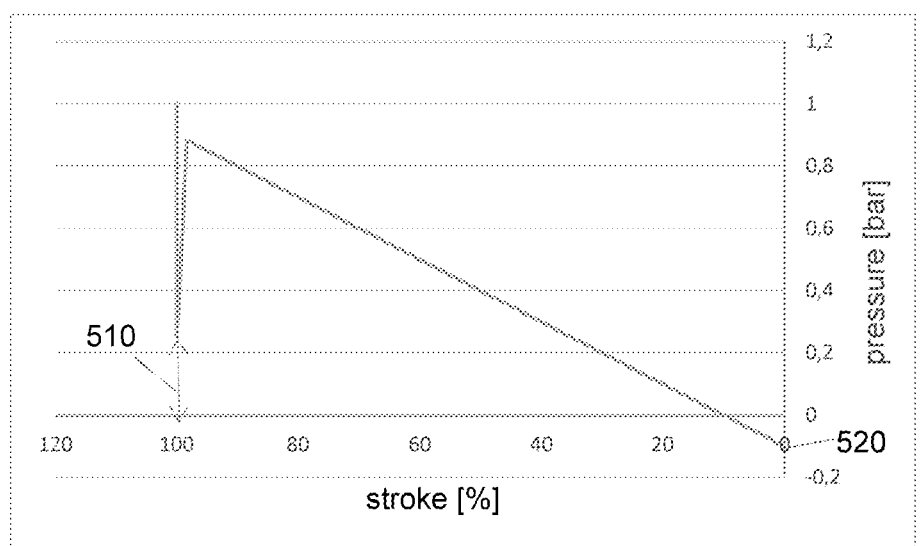
FIG. 5 shows an example of a negative closing pressure reserve.

In FIG. 5 even a negative closing pressure reserve 520 occurs, so that a safe closing of the safety valve 100 is no longer possible. This case can occur with very high sliding friction, e.g. at the valve rod. Furthermore FIG. 5 shows the breakaway reserve 510 for this example.

Glossary

Fluidic Drive of a Valve

One refers to a fluid driven valve, if the drive rod of the valve is moved by a membrane which is pressurized by a fluid, typically compressed air, and thereby positioned.

Stroke-Pressure Curve

The stroke-pressure curve of a valve or a partial stroke test gives the position of the valve member, in other words: the stroke, in dependence of the pressure in the drive fluid of the fluidic driven valve.

PST: see Partial Stroke Test

Partial Stroke Test

In order to ensure the safe operation of a fitting, it is cyclically tested whether the actuator moves. During these tests it is not desired that the fitting moves completely to the safety position in order not to disturb the running process. In a partial stroke test, the actuator is only moved as far as is necessary to ensure that the actuator moves a part of its travel without significantly influencing the process of the plant. Thereby it is also tested whether the actuator detaches or breaks loose from its position at all. The actuator returns to its initial position after the partial stroke test. With this test the basic movability of the actuator can be tested.

Valve Member

The valve member is the element that closes the valve when it is pressed onto the valve seat.

REFERENCE NUMERALS 100 process valve
105 valve housing
110 inflow side
115 downstream side
120 valve member
125 valve seat
130 valve rod or actuator rod
140 stuffing box or seal
145 fluidic drive
150 compressed air chamber
155 upper chamber
160 spring
165 plate
170 membrane
175 Drive housing sealing
180 signal receiver
210 nominal value of the stroke
220 actual value of the pressure
230 actual value of the stroke
240 breakaway pressure
250 breakaway pressure reserve
310 breakaway reserve
320 closing pressure reserve
330 two points for the determination of the interpolation line
340 interpolation line
350 pressure value at stroke=0
360 90% of stroke, end of PST
410 breakaway reserve
420 closing pressure reserve
510 breakaway reserve
520 negative closing pressure reserve

The invention claimed is:

1. A method for determining the operability of a fluid driven safety valve with a valve member (120) and a spring return,
wherein the valve member is to be moved to a safety position by the spring return in case of a complete pressure drop of the driving fluid;
wherein the safety valve has means for determining the pressure of the driving fluid;
wherein the pressure of the driving fluid acts against the spring (160);
wherein the safety valve has means (180) for determining the position of the valve member;
wherein the method comprises the following steps:
a partial stroke test is performed on the safety valve by varying the pressure in the driving fluid;
the position of the valve member (230) in dependence of the pressure (220) in the driving fluid is recorded during the partial stroke test, whereby a stroke-pressure curve is obtained;
the stroke-pressure curve is mathematically modeled beyond the measured range;
the mathematically determined stroke-pressure curve is extrapolated up to the safety position of the valve member (340, 350);
the pressure (320; 420; 520) corresponding to this safety position in the mathematically determined stroke-pressure curve is determined.

2. The method according to claim 1,
wherein,
for the extrapolation of the stroke-pressure curve, the stroke-pressure curve is modelled in a relevant range by a linear equation; and
the linear equation for the stroke-pressure curve is determined from at least two stroke-pressure values (220, 230; 330) measured during the partial stroke test.

3. The method according to claim 2,
wherein,
the at least two stroke-pressure values (220, 230; 330) measured during the partial stroke test are measured after the static friction of the valve member has been overcome.

4. The method according to claim 1,
wherein,
during commissioning of the safety valve, a stroke-pressure characteristic curve for the safety valve is recorded; and
the stroke-pressure curve is mathematically modelled beyond the measured range by shifting the stroke-pressure characteristic curve recorded during commissioning of the safety valve to a stroke-pressure value measured during the partial stroke test after the static friction of the valve member has been overcome.

5. The method according to claim 4,
wherein,
the stroke-pressure characteristic curve for the safety valve recorded during commissioning of the safety valve is approximated by a linear equation in a range after the static friction of the valve member has been overcome.

6. A fluid driven safety valve having
a valve member (120) and
a spring return;
wherein the valve member is to be moved to a safety position by the spring return in case of a complete pressure drop of the driving fluid;
means for determining the pressure of the driving fluid;
wherein the pressure of the driving fluid acts against the spring (160);
means (180) for determining the position of the valve member;
a control having means to carry out a sequence of steps according to claim 1, wherein
the control performs a partial stroke test on the safety valve by varying the pressure in the driving fluid; and
wherein
during the partial stroke test, the control records the position of the valve member (230) dependent on the pressure (220) of the driving fluid during the partial stroke test, whereby a stroke-pressure curve is obtained;
the control calculates the stroke-pressure curve beyond the measured range;
the control further calculates and extrapolates (340, 350) the stroke-pressure curve to the safety position of the valve member; and
determines the pressure (320; 420; 520) corresponding to this safety position in the calculated stroke-pressure curve.

7. A processor coupled to a memory programmed with executable instructions which control a safety valve with a valve member driven by a fluid, wherein the executable instructions carry out steps which perform a partial stroke test on the safety valve by varying a pressure in the fluid; and during the partial stroke test, record the position of the valve member dependent on the pressure of the fluid during the partial stroke test, whereby a stroke-pressure curve is obtained, calculate the stroke-pressure curve beyond the measured range, further calculate and extrapolate the stroke-pressure curve to a safety position of the valve member; and determine the pressure corresponding to the safety position in the stroke-pressure curve.

\* \* \* \* \*